United States Patent

[11] 3,616,214

[72] Inventors Isao Takeda
  Iruma-gun;
  Takashi Iguchi, Tokyo, both of Japan
[21] Appl. No. 819,938
[22] Filed Apr. 28, 1969
[45] Patented Oct. 26, 1971
[73] Assignee Asahi Kasei Kogyo Kabushiki Kaisha
  Osaka, Japan
[32] Priority May 8, 1968
[33] Japan
[31] 43/30263

[54] CULTURE OF MICROORGANISMS ON HYDROCARBONS
  9 Claims, No Drawings
[52] U.S. Cl.................................................... 195/28, 195/47, 195/82
[51] Int. Cl.................................................... C12d 13/06
[50] Field of Search.......................................... 195/28, 29

[56] References Cited
UNITED STATES PATENTS
3,406,095  10/1968  Otsuka et al..................  195/28

Primary Examiner—A. Louis Monacell
Assistant Examiner—Seymour Rand
Attorney—Stevens, Davis, Miller & Mosher ABSTRACT: A method to produce L-glutamic acid, inosine, and yeast in good yield, at first by adding higher boiling portions of petroleum fractions, paraffin oil, and normal paraffin as the source of hydrocarbons ($C_{14}$–$C_{18}$) to the culture medium in which micro-organisms and yeast are cultured, and then by adding lower boiling portions of widely ranged hydrocarbons.

CULTURE OF MICROORGANISMS ON HYDROCARBONS

This invention relates to a method of production of L-glutamic acid, yeast and other useful substances using culture medium containing hydrocarbons such as petroleum fractions, paraffin oil and normal paraffin (abbreviating as n-paraffin) as the source of hydrocarbon. It further relates to a method of production of L-glutamic acid, yeast and other useful substances in good yield by adding higher boiling fractions of hydrocarbons in the beginning and then hydrocarbons containing lower boiling fractions which are utilized in the culture.

In general, concerning the growing of micro-organisms on hydrocarbons as the source of carbon, it has been reported that $C_{10}-C_{13}$ n-paraffins or petroleum fractions containing them had little growing ability, and that good results could not be obtained in formations of L-glutamic acid, inosine or yeast. For example, for the glutamic acid forming micro-organisms it was reported in Journal of Agricultural Chemical Society of Japan (Nippon Nogeikagaku Kaisha) vol. 40 (1), pages 26-32 (1966): Abstracts of Proceeding of the Annual Meeting of Agricultural Chemical Society of Japan (Nippon Nogeikagakukai Koenyoshishu) pages 370-371 (1968): for yeast it was reported in Agricultural and Biological Chemistry vol. 29 (9), pages 796-803 (1965): oil and oil chemistry (Sekiyu to Sekiyukagaku) vol. 11 (11), pages 26-31 (1967) etc. The method of production of L-glutamic acid, yeast and other useful substances in good yield using petroleum fractions or n-paraffins of wide-range carbon numbers effectively, should be established to obtain the fermentation products at low cost from hydrocarbon-utilizing bacteria or yeast.

Inventors have investigated to cost down the production of L-glutamic acid, yeast and other useful substances utilizing n-paraffins of lower carbon numbers or petroleum fractions containing them, which has been a technical problem.

It was found possible consequently to form these useful substances in good yield by culturing micro-organisms or yeast on n-paraffins or petroleum fractions containing them as the source of carbon, and then by adding n-paraffins of lower carbon numbers or petroleum fractions containing them.

Considering the invention in more detail, the culture was continued thus: Corynebacterium petrophilium (ATCC No. 19,080), described in Japanese Pat. No. '67-510, was inoculated into the culture medium consisting of n-hexadecane as the main source of carbon, as shown in table 1, cultured about 15 hours under aerobic conditions, then added 4.5 g./dl. of $C_8-C_{13}$ n-paraffin and further 50 IU/ml. of penicillin G. The formation of L-glutamic acid was 2.5 g./dl. after 72 hours from the beginning.

TABLE 1

| | | | |
|---|---|---|---|
| n-hexadecane | 0.4 g. | ferrous sulfate | 0.004 g. |
| ammonium sulfate | 0.3 g. | yeast extract | 0.2 g. |
| urea | 0.8 g. | water (tap water) | 100 ml. |
| potassium dihydrogen-phosphate | 0.1 g. | pH | 7.0 |
| magnesium sulfate | 0.05 g. | | |

Also using the culture medium, as shown in table 2, Candida petrophilum (ATCC No. 20,226), which was described in Japanese Pat. No. '65-20666, was inoculated, cultured for 15 hours, and added 1.6 g./dl. of $C_{10}-C_{13}$ n-paraffin, then cultured for 20 hours. The amount of dried micro-organisms in the culture medium was 2 g./dl.

TABLE 2

| | | | |
|---|---|---|---|
| n-hexadecane | 0.4 g. | ferrous sulfate | 0.004 g. |
| ammonium sulfate | 0.1 g. | yeast extract | 0.1 g. |
| urea | 0.2 g. | water (tap water) | 100 ml. |
| potassium dihydrogen-phosphate | 0.1 g. | pH | 5.0 |
| magnesium sulfate | 0.05 g. | | |

Those methods of culturing production of L-glutamic acid, inosine and yeast in good yield by using hydrocarbons of lower boiling portions could apply wisely to other bacteria such as Corynebacterium hydrocarboclastus M 104 (ATCC No. 21,402), Corynebacterium oleofils kp-6-1414 (ATCC No. 21,403) as described in Japanese Pat. No. '68-6989. It was confirmed to be able to adapt the adeninless mutant in Corynebacterium petrophilum No. 1002 (ATCC No. 21,404 for the inosine production, and Candida lipolytica, Candida tropicalis, Torulopsis petrophilum (ATCC No. 20,225) as hydrocarbon-utilizing yeast for the yeast production.

The invention will be further understood by reference to the following examples which are given for illustrative purpose only and are not intended to be limiting.

EXAMPLE 1

The culture medium, shown in table 1, was poured into 50ml./500 ml. shaking flask, and cultured by shaking after Corynebacterium hydrocarboclustus M 104 (ATCC No. 21,402) was inoculated. After 15 hours, 4.6 g. of $C_{10}-C_{13}$ n-paraffin, and then 30 IU/ml. of penicillin G were added. The amount of L-glutamic acid formed in the culture medium after 70 hours from the beginning was 1.5 g./dl. On the other hand, only 0.5 g./dl. On the other hand, only 0.5 g./dl. of L-glutamic acid formed when the fermentation was continued similarly, except the addition of 4.4 g. of $C_{10}-C_{13}$ n-paraffin with 0.4 g./dl. of n-hexadecane in the beginning.

EXAMPLE 2

L-glutamic acid was produced by the same method in example 1. In the beginning of the culture, petroleum fractions containing $C_{14}-C_{18}$n-paraffin mainly was added, after 15 hours, then added n-paraffin of widely ranged $C_9-C_{18}$, thus L-glutamic acid formed. 1.9 g./dl. of L-glutamic acid was produced by using strains of Corynebacterium oleophilus kp-6-1414 (ATCC No. 21,403).

EXAMPLE 3

Ten mg./dl. of adenine was added to the culture medium consisting of table 1, which was cultured by shaking after adeninless mutant Corynebacterium petrophilium No. 1002 (ATCC No. 21,404) was inoculated. After 15 hours, 4.6 g. of $C_{10}-C_{13}$ n-paraffin was added. The amount of inosine formed in the culture medium after 70 hours from the beginning was 0.25 g./dl. On the other hand, only 0.05 g./dl. of inosine formed when the fermentation was continued similarly, except the addition of 4.6 g. of $C_{10}-C_{13}$ n-paraffin with 0.4 g. of n-hexadecane in the beginning.

EXAMPLE 4

Five liters culture medium consisting of table 2 was poured into a 10-liter jar-fermentor. Candida tropicalis was then inoculated, and cultured at 30° C., 500 r.p.m., at the aerating degree of 5 l./min. After 10 hours from the beginning, $C_9-C_{16}$ n-paraffin was added. Thus yeast was produced. Yeast were obtained by centrifugal separation and drying the culture solution. About 1 kg. of yeast was obtained from 1 kg. of hydrocarbon added.

What we claim is:

1. Method for producing L-glutamic acid, inosine and yeast in good yield in a culture medium of hydrocarbons as the main source of carbon, in which hydrocarbon-utilizing bacteria and yeast are grown on a straight-chain paraffin of higher boiling portions of hydrocarbons in the beginning of the culture and thereafter adding lower boiling portions of hydrocarbons of wide-range carbon numbers.

2. According to claim 1, the carbon number of higher boiling portions of hydrocarbons of $C_{14}-C_{18}$.

3. According to claim 1, higher boiling portion of hydrocarbon is hexadecane ($C_{16}H_{34}$).

4. According to claim 1, the carbon number of lower boiling portions of hydrocarbons is $C_8$–$C_{13}$.

5. According to claim 1, bacteria is selected from the group of *Corynebacterium petrophilum* (ATCC No. 19,080), *Corynebacterium hydrocarboclastus* M 104 (ATCC No. 21,412), *Corynebacterium oleofils* kp–61414 and adeninless mutant in *Corynebacterium petrophilum* No. 1002 (ATCC No. 21,404).

6. According to claim 1, yeast is selected from the group of *Candida petrophilum* (ATCC No. 20,226), *Candida lipolytica*, *Candida tropicalis* and *Torulopsis petrophilum* (ATCC No. 20,225).

7. According to claim 1, the culture medium of hydrocarbons is petroleum fractions, or paraffin oil, or normal paraffin.

8. According to claim 7, culture medium of hydrocarbons is normal paraffin.

9. According to claim 7, culture medium of hydrocarbons is normal paraffin and petroleum fractions containing normal paraffin mainly.